United States Patent [19]

Bannister

[11] Patent Number: 4,681,165

[45] Date of Patent: Jul. 21, 1987

[54] AQUEOUS CHEMICAL WASH COMPOSITIONS

[75] Inventor: Charles E. Bannister, Tulsa, Okla.

[73] Assignee: Dowell Schlumberger Incorporated, Tulsa, Okla.

[21] Appl. No.: 585,061

[22] Filed: Mar. 1, 1984

[51] Int. Cl.$^4$ .................... E21B 33/05; C09K 7/02
[52] U.S. Cl. .................... 166/312; 166/291; 252/8.552; 252/8.551; 252/DIG. 1; 252/DIG. 7; 524/379
[58] Field of Search ............ 252/8.55 R, 8.55 B, 252/8.55 D, DIG. 7, DIG. 1; 166/291, 312; 524/379

[56] References Cited

U.S. PATENT DOCUMENTS

| | | | |
|---|---|---|---|
| 2,978,026 | 4/1961 | Bemis | 252/8.55 B |
| 3,215,200 | 11/1965 | Kirkpatrick et al. | 252/8.55 B |
| 3,891,566 | 6/1975 | Crowe | 524/379 |
| 4,207,194 | 6/1980 | Sharpe et al. | 252/8.55 B |
| 4,371,444 | 2/1983 | McCoy et al. | 252/8.55 D |

FOREIGN PATENT DOCUMENTS 0070075 1/1983 European Pat. Off. ....... 252/8.55 B

OTHER PUBLICATIONS

"Hackh's Chemical Dictionary", J. Grant (ed), McGraw-Hill, Inc. (1969), p. 650.

*Primary Examiner*—Joseph L. Schofer
*Assistant Examiner*—F. M. Teskin
*Attorney, Agent, or Firm*—L. Wayne White

[57] ABSTRACT

Aqueous chemical washes suitable for use in conjunction with well cementing operations are disclosed which comprise water, an anionic or a non-ionic surfactant (or a combination thereof) and a fluid loss control agent of the type described in U.S. Pat. No. 3,891,566.

16 Claims, No Drawings

AQUEOUS CHEMICAL WASH COMPOSITIONS

BACKGROUND OF THE INVENTION

This invention pertains to aqueous chemical wash compositions containing water, a water soluble surfactant and a fluid loss control additive and to the use of such compositions as a preflush in well cementing operations and/or for the removal of drilling mud from a borehole.

Aqueous chemical wash compositions containing water, an amphoteric surfactant and a fluid loss control additive composed of a mixture of dispersed oil-soluble friable resin particles and dispersed oil-soluble pliable resin particles, and the use of said compositions as a preflush in well cementing operations and/or for removal of drilling mud from a borehole, are disclosed in U.S. Pat. Nos. 4,127,174 and 4,207,194. Such compositions have been found to be particularly useful in terms of their fluid loss control and drilling mud removal effectiveness.

SUMMARY OF THE INVENTION

It has now been found that the aforementioned prior art chemical wash compositions have certain heretofore unrecognized limitations in that, at elevated temperatures (e.g., at about 125° F. and above), said chemical wash compositions can exhibit or encounter a precipitation of the fluid loss control additive therefrom and can thereby suffer a substantial and detrimental decrease in their fluid loss control properties at said elevated temperatures.

It has also been found that the aforementioned elevated temperature precipitation limitation can be substantially improved or alleviated by replacing at least a portion of the aforementioned amphoteric surfactant material with an anionic or a nonionic surfactant or a combination thereof. Accordingly, in one aspect the present invention is an aqueous chemical wash composition which is suitable for use as a preflush in well cementing operations and/or for removal of drilling mud from a borehole. Such composition is predominantly composed of water, contains an active surfactant component comprising a water soluble anionic or nonionic surfactant or a combination thereof and has dispersed therein a heterogeneous mixture of distinct particles comprising both a first particulate oil soluble resin which is friable and a second particulate oil soluble resin which is pliable and wherein the size of said friable resin particles ranges from about 0.5 to about 300 microns and the size of said pliable resin particles ranges from about 0.05 to about 30 microns. Said friable resin particle/pliable resin particle blend or mixture is employed in said chemical wash in an amount sufficient to impart effective fluid loss control thereto.

In another aspect, the present invention resides in an improved method of cementing a conduit in a borehole wherein a zone in said borehole to be contacted with a cement slurry is flushed with an aqueous chemical wash composition and the cement slurry is thereafter injected into said zone and wherein the aqueous chemical wash is of the type containing water, a water soluble amphoteric surfactant and a mixture of dispersed friable oil-soluble resin particles and oil-soluble pliable resin particles. In said method, the improvement comprises the use of an aqueous chemical wash composition in which at least a portion of the amphoteric surfactant has been replaced by a water soluble anionic or nonionic surfactant or a combination thereof.

In yet another aspect, the present invention resides in an improved method for removing drilling mud from a borehole. In said method, the mud is contacted with an effective quantity of a chemical wash composition of a type containing water, a water soluble amphoteric surfactant and a mixture of dispersed oil-soluble friable and pliable oil-soluble resin particles and is displaced from the borehole and, in said method, the improvement comprises the use of an aqueous chemical wash composition in which at least a portion of the amphoteric surfactant is replaced by a water soluble anionic or nonionic surfactant or a combination thereof.

The present invention is particularly advantageous in the sense that it provides aqueous chemical wash compositions having effective fluid loss control over an extended (e.g., higher) range of operating temperatures. Moreover, such improved feature is especially desirable at the present time in view of the increasing trend toward deeper and hotter oil and gas well drilling operations as well as in conjunction with geothermal well drilling operations.

DETAILED DESCRIPTION OF THE INVENTION

Mixed friable/pliable resin particle blend fluid loss control agents of the type employed herein are disclosed and discussed in detail in U.S. Pat. No. 3,891,566. The teachings of said patent relating to such fluid loss control agents are hereby incorporated by reference. In addition, the teachings of U.S. Pat. Nos. 4,127,174 and 4,207,194 pertaining to the use of said fluid loss control agents in aqueous chemical wash compositions (and pertaining to the use of said washes as preflushes in well cementing and for drilling mud removal) are also hereby incorporated by reference.

Anionic surfactant materials suitable for use in the present invention include any water soluble anionic surfactants which are capable of facilitating the removal of drilling mud from borehole and/or which serve to enhance the bonding of cement to the walls of the borehole and/or to the walls of a conduit (e.g., a casing) placed in said borehole. Examples of such suitable anionic surfactant materials include the various known sulfonated surfactant materials such as for example diphenyl sulfonate and derivatives thereof, alkyl sulfonates and salts thereof such as sodium lauryl sulfate, alkyl aryl sulfonic acids and the various water soluble salts thereof such as dodecyl benzene sulfonic acid and its water soluble salts; amino carboxylate salt surfactants such as the alkali metal salts of fatty acid amine compounds; and the like.

Higher (e.g., $C_8$ to $C_{18}$) aliphatic hydrocarbyl substituted aromatic sulfonic acids such as dodecyl benzene sulfonic acid and/or the various water soluble salts thereof are particularly preferred for use as the anionic surfactant component in the present invention.

The amount of anionic surfactant employed in the present invention can be varied somewhat depending upon the specific performance criteria of interest and depending upon what other ingredients are employed in the particular chemical wash composition of concern. However, as a general rule the anionic surfactant, if present at all, will be employed in an amount of from about 0.1 to about 1.5 (preferably from about 0.2 to about 1) weight percent based upon the total weight of the aqueous chemical wash composition.

Nonionic surfactant materials suitable for use herein are generally those water soluble nonionic surfactants that are capable of facilitating drilling mud removal from a borehole and/or of enhancing the bonding of cement to the walls of the borehole and/or to the walls of a conduit contained therein. Suitable nonionic surfactants for use herein are those which are truly nonionic in character and which have essentially no cationic character associated therewith. Examples of such suitable nonionic surfactants include ethoxylated alcohols, ethoxylated alkyl phenols, carboxylic acid esters of polyalkylene glycol materials, block copolymers of ethylene oxide with higher alkylene oxides such as propylene oxide, butylene oxide, etc; carboxylic acid (e.g., fatty acid) esters and alkyl or alkylphenyl ethers of such block copolymers; and the like. Particularly preferred nonionic surfactant materials for use herein include polyalkylene glycol-based nonionic surfactants such as, for example, those prepared by condensing one mole of a relatively hydrophobic (e.g., $C_8$–$C_{18}$) hydroxyl-containing compound (e.g., such as di-sec-butyl phenol, nonylphenol, etc.) with several moles (e.g., from 5 to 10 to 20 etc.) of of an alkylene oxide material such as ethylene oxide.

The amount of nonionic surfactant employed herein can also vary somewhat depending upon the other ingredients employed, and upon the specific properties desired, in a given instance. As a general rule, however, the nonionic surfactant, if employed, will be used in an amount ranging from about 0.1 to about 1.5 (preferably from about 0.2 to about 1) weight percent based upon the total weight of the aqueous chemical wash composition. In those instances where said nonionic surfactant is employed alone (i.e., in the absense of anionic surfactant) it is generally preferred to employ same in an amount ranging from about 0.4 to about 1.5 weight percent based upon the total weight of the chemical wash composition.

In a preferred embodiment of the present invention, both anionic and nonionic surfactants are employed in combination in the subject aqueous chemical wash compositions. This is particularly desirable, for example, in those instances where one of the surfactant materials (e.g., the anionic) has a pronounced propensity to foam; where foaming or excessive foaming is undesirable; and where the other surfactant material (e.g., the nonionic) is of a low-foaming character. In those embodiments where a combination of nonionic and anionic surfactants is employed, the total amount of said surfactant combination used is typically in the range of from about 0.1 to about 1.5 (preferably from about 0.2 to about 1) weight percent based upon the total weight of the chemical wash composition. Further, the anionic surfactant to nonionic surfactant weight ratio in such mixed surfactant systems is typically in the range of from about 10:1 to 1:2 and is more preferably in the range of from about 2:1 to 1:1.

In another preferred embodiment, the aqueous chemical wash compositions of the present invention further comprise a small proportion (e.g., from about 0.05 to about 0.54 weight percent based upon the total weight of said composition and/or from about 3 to about 80, more preferably from about 3 to about 50 and most preferably 3 to about 20, weight percent of the total surfactant content of said composition) of an ampoteric surfactant material in addition to the above-described anionic and/or nonionic surfactant ingredients or surfactant mixtures. In this embodiment it is preferred that the amphoteric surfactant material be a water soluble reaction product of at least one di- or trialkanol amine, or a mixture thereof, with at least one fatty acid such as those employed in the aqueous chemical wash compositions of U.S. Pat. Nos. 4,127,174 and 4,207,194.

Thus, this latter embodiment of the present invention can be characterized as being an improvement in the chemical wash composition, and in the drilling mud removal and the borehole conduit cementing methods, of U.S. Pat. Nos. 4,127,174 and 4,207,194 in which the improvement comprises replacing a portion (e.g., from about 20 to about 97, preferably from about 50 to about 97, and most preferably from about 80 to about 97 weight percent), but less than all, of those patent's amphoteric surfactant materials with an anionic surfactant or a nonionic surfactant or (and preferably) a combination thereof.

As has been alluded to briefly above, in certain instances (e.g., in the case of certain surfactants or surfactant combinations) the resultant chemical wash composition may tend to foam in use to an undesirable or unacceptable degree. In that event (and/or as a generally applicable safeguard), it may be advantageous to include a suitably effective amount (e.g., from about 0.5 to about 3, preferably from about 1 to about 2 percent, weight percent on a total chemical wash weight basis) of a conventional antifoaming or defoaming agent in the aqueous chemical wash compositions of interest. Suitable defoaming agents for use under such circumstances include known silicone based defoaming or antifoaming agents such as DOW ANTIFOAM A which is commercially available from The Dow Chemical Company; polyethylene glycol based defoaming agents such as polyethylene glycol 6000 from The Dow Chemical Company; and the like with said silicone-based materials being especially preferred for such purpose.

The use of the chemical wash compositions of the present invention for the removal of drilling mud from a borehole and/or as a preflush in conjunction with (e.g., as a precursor to) cementing operations is generally conducted pursuant to conventional oil and/or gas well drilling and/or completion practices. Thus, for example, in using the chemical wash to remove drilling mud from a borehole prior to cementing operations a sufficient amount of the chemical wash is injected in a borehole to be cemented in advance of the cement slurry, to adequately thin the mud so that substantially no viscous plug is formed along the leading edge of the cement. As those skilled in the art will realize, use of greater amounts of chemical wash, within reason, results in a cleaner borehole, and consequently better cement jobs. Generally, an amount of chemical wash sufficient to give an effective contact time of from about 8 to about 10 minutes or more is sufficient for most applications. Thus, for example, when the chemical wash is being pumped at a rate of 5 barrels per minute, the minimum amount of wash to be employed will typically be in the range of 40 to 50 barrels in order to give the generally desired amount of minimum contact time.

The aqueous chemical wash compositions of the present invention are generally suitable for use with water-based muds and with oil-in-water emulsion muds. In addition, embodiments of the instant chemical wash compositions containing relatively high surfactant concentrations, for example, in the range of about 0.3 to about 3 weight percent on a total chemical wash weight basis and preferably having a relatively high proportion, (e.g., from about 10 to about 60 weight percent based upon total surfactant content, of a relatively low foaming nonionic surfactant) can also be suitably employed with oil-based drilling muds and with water-in-oil emulsion based drilling muds as well.

The aqueous chemical wash compositions of the present invention can also be advantageously employed in connection with the cementing of air drilled boreholes. In this latter instance, the use of the chemical wash ahead of the cementing operation is for the purposes of conditioning the borehole (e.g., to minimize fluid loss during cementing) as opposed to accomplishing drilling mud removal.

Further, it should also be recognized that the use of the aqueous chemical washes of this invention are not necessarily limited to pre-cementing operations and that said washes can be suitably employed any time that removal of drilling mud from the borehole is desired for whatever reason.

In addition to the various ingredients discussed hereinbefore, the aqueous chemical wash compositions may also contain, if desired, effective amounts of other functional additives which do not deleteriously affect its chemical wash effectiveness such as, for example, dyes to aid in recognizing wash being returned from the borehole to the surface and the like.

The following examples, in which all parts and percentages are on a weight basis unless otherwise indicated, are intended to further illustrate and exemplify the practice of the present invention.

EXAMPLE 1

In this example, an aqueous chemical wash composition is prepared by dissolving 2 parts by weight of an anionic surfactant (i.e., dodecyl benzene sulfonic acid) into 100 parts by weight of water and by dispersing into the resulting aqueous surfactant solution 0.6 parts by weight of a friable resin particle/pliable resin particle dispersion as a fluid loss control additive. (Said resin dispersion corresponds to Resin A in the Examples of U.S. Pat. No. 4,127,174 and is a 50% solids aqueous dispersion containing on a total weight basis 30.8% Picconol A102 resin dispersion, 17.06 Piccomer 150 brand resin, 24% water, 9.9% ammonium chloride, 0.3% antifoam agent, 4.7% of an adduct of di-sec-butyl-phenol and 10 moles of ethylene oxide 11.4% cocobetaine, 1.4% isopropanol and having a basic pH.) The resulting chemical wash composition is a stable, milky white liquid.

The aqueous chemical wash composition is then evaluated for fluid loss control as a function of temperature at a pressure differential of 1000 psi using a 1 inch diameter by 1 inch long 50 millidarcey (md) core sample. The results of such fluid loss evaluation are summarized in Table I below.

For comparative purposes, a similar aqueous chemical wash composition is prepared and tested in which an amphoteric surfactant such as that employed in U.S. Pat. No. 4,127,174 is used in place of the above noted anionic surfactant. The results of this comparative testing are also shown in Table I below.

TABLE I

| Testing Temperature (°F.) | Fluid Loss (ml/30 min.) | |
|---|---|---|
| | Chemical Wash From Example 1 | Comparative Wash |
| 70 | 64 | 30 |
| 100 | 48 | — |
| 125 | 44 | 43 |
| 150 | 48 | greater than 300 |
| 175 | 58 | — |
| 200 | 65 | — |

As can be seen from Table I, the chemical wash of this example retains its fluid loss effectiveness at temperatures ranging from 70° to 200° F. In contrast, the comparative wash appears to loose its fluid loss control effectiveness in the range of from 125° to 150° F.

EXAMPLE 2

In this example, the chemical wash composition of Example 1 is evaluated for compatibility with an Oklahoma Class H Portland cement and is found to have very good cement compatibility.

In addition, the chemical wash composition is tested to determine its effectiveness in removing oil-base drilling mud. In this test, 10 grams of Black Magic oil-base mud is placed in a 1 oz. bottle. A predetermined amount of the chemical wash composition is then added to the bottle and the bottle is then capped and shaken for 30 seconds. The resulting oil-in-chemical wash mixture is then removed from the jar; the residual undispersed oil-base mud is drained and the weight of the remaining, non-dispersed mud is determined. The results of this testing at both 70° F. and 150° F. are presented in Table II below.

TABLE II

| Amount of Chemical Wash Employed (grams) | Amount of Mud Remaining (grams) | | Percent of Mud Removed (% by weight) | |
|---|---|---|---|---|
| | 70° F. | 150° F. | 70° F. | 150° F. |
| 2 | 2.1 | less than 2.3 | 79% | 77% |
| 5 | 0.8 | less than 0.2 | 92% | 98+ |
| 10 | 0.5 | less than 0.2 | 95% | 98+ |
| 20 | 0.8 | less than 0.2 | 92% | 98+ |

EXAMPLE 3

In this example a chemical wash concentrate is prepared by combining, on a total wash concentrate weight basis, 50 weight percent of a silicone based antifoaming agent; 20 weight percent dodecyl benzene sulfonic acid; 15 weight percent of ethoxylated nonyl phenol and 15 weight percent of an amphoteric surfactant composed of a reaction product of triethanol amine with a mixture of fatty acids.

The resulting chemical wash concentrate is then admixed, in an amount of 2.44 parts by weight, with approximately 100 parts by weight of water and 0.6 parts by weight of the friable resin/pliable resin fluid loss control additive identified in Example 1 above to form an aqueous chemical wash composition.

The resulting chemical wash composition is thereafter subjected to fluid loss evaluation as a function of temperature at a pressure differential of 1000 psi using 40 to 60 millidarcie 1 inch diameter Berea sandstone cores and the results of such evaluation are summarized in Table III below.

TABLE III

| Run Number | Test Temperature; °F. | Fluid Loss (ml/30 min.) |
|---|---|---|
| 3.1 | 80 | 6 |
| 3.2 | 125 | 5 |
| 3.3 | 150 | 6 |
| 3.4 | 175 | 8 |
| 3.5 | 200 | 13 |
| 3.6 | 235 | 40 |
| 3.7 | 250 | 157 |
| 3.8* | 250 | 50 |
| 3.9* | 270 | 64 |

*Amount of friable/pliable resin fluid loss additive increased to 1.2 parts as opposed to 0.6 parts in these runs.

In this example a series of chemical wash compositions are prepared and are evaluated for fluid loss performance at a temperature of 200° F. and at a pressure differential of 1000 psi using 30 to 50 millidarcie 1 inch diameter Berea sandstone cores. In addition observations are made about precipitate formation and/or the foaming propensity of the resulting compositions at the stated 200° F. testing temperature.

The compositional make-up of the various chemical wash formulations as well as the fluid loss evaluation results and observations are summarized in Table IV below.

TABLE IV

| | Wash Composition[1] | | | | |
|---|---|---|---|---|---|
| Run Number | Nonionic Surfactant[2] (wt. %) | Anionic Surfactant[3] (wt. %) | Amphoteric Surfactant[4] (wt. %) | Fluid Loss Performance (ml/30 min) | Observations |
| 4.1* | 0 | 0 | .6 | Blow out[5] | PPT[6] |
| 4.2 | 0 | .27 | .54 | Blow out[5] | PPT |
| 4.3 | .2 | .27 | .54 | 50 ml | PPT |
| 4.4 | .4 | .27 | .54 | 29 ml | No PPT |
| 4.5 | .27 | 0 | .54 | Blow out[5] | PPT |
| 4.6 | .27 | .2 | .54 | 27 ml | No PPT |
| 4.7 | .27 | .4 | .54 | 24 ml | No PPT |
| 4.8 | .27 | .27 | 0 | — | Substantial Foaming |
| 4.9 | .27 | .27 | .4 | 26 ml | No PPT |
| 4.10 | .27 | .27 | .8 | Blow out[5] | PPT |

*Not an example of the present invention.
[1]Surfactant percentages are given on a by weight basis based upon the total weight of water in the aqueous chemical wash composition. All washes contain predominately water and further contain 0.6 weight percent of the friable/pliable resin fluid loss additive described in Example 1 above and 1.34 weight percent of a silicone-based antifoaming additive, both being stated on a by weight of water percentage basis.
[2]Nonionic surfactant = ethoxylated nonylphenol.
[3]Anionic surfactant = dodecyl benzene sulfonic acid.
[4]Amphoteric surfactant = reaction product of fatty acid mixture and triethanol amine.
[5]"Blow out" denotes lack of effective fluid loss control.
[6]"PPT" stands for precipitate formation.

As can be seen from the results presented in Tables III and IV above, preferred chemical wash embodiments of the present invention containing a combination of nonionic and anionic surfactants and reduced levels of amphoteric surfactant exhibit satisfactory fluid loss control properties at elevated temperatures such as, for example in the range of 200° F. and above.

While the subject matter hereof has been illustrated by reference to particularized embodiments and examples thereof, such fact is not to be understood as in any way limiting the score of the instantly claimed invention.

What is claimed is:

1. An aqueous, substantially unfoamed chemical wash composition having properties making it suitable for use as a pre-flush in well cementing operations and/or for removal of drilling mud from a borehole at a temperature of from about 150° F. to about 270° F., said wash
   a. being predominately composed of water,
   b. containing an active surfactant component comprising a combination of (1) from about 0.1 to about 1.5 weight percent (total weight basis) of a water soluble anionic surfactant; (2) from about 0.1 to about 1.5 weight percent (total weight basis) of a nonionic surfactant; and (3) from about 0.05 to about 0.54 weight percent (total weight basis) of at least one water soluble amphoteric surfactant, and
   c. having dispersed therein a heterogeneous mixture of distinct particles comprising both a first particulate oil soluble resin which is friable and a second particulate oil soluble resin which is pliable and wherein the size of said friable resin particles ranges from about 0.5 to about 300 microns and the size of said pliable resin particles ranges from about 0.05 to about 30 microns, the amount of said friable-pliable resin mixture being sufficient to impart effective fluid loss control to said chemical wash composition.

2. The chemical wash of claim 1 wherein the friable resin to pliable resin weight ratio in said wash is from about 1:20 to about 20:1, wherein the friable resin and pliable resin in combination constitute at least 0.025 weight percent of said wash and wherein the active surfactant constitutes from about 0.15 to about 3 weight percent of said wash.

3. The chemical was of claim 1 wherein the anionic surfactant is a higher aliphatic hydrocarbyl substituted aromatic sulfonic acid or a water soluble salt thereof.

4. The chemical wash of claim 1 wherein the nonionic surfactant is a polyalkylene glycol-based nonionic surfactant.

5. The chemical wash of claim 1, 2 or 3 which further comprises an effective amount of a defoaming agent or an antifoaming agent.

6. The chemical wash of claim 1 wherein the amphoteric surfactant is a water soluble reaction product of at least one di- or trialkanol amine, or a mixture thereof, with at least one fatty acid.

7. The chemical wash of claim 1 wherein said anionic surfactant is present in an amount from about 0.2 to about 1 weight percent (total weight basis).

8. The chemical wash of claim 1 wherein said nonionic surfactant is present in an amount from about 0.2 to about 1 weight percent (total weight basis).

9. The chemical wash of claim 1 wherein said active surfactant component comprises an anionic surfactant in an amount from about 0.2 to about 0.4 weight percent (total weight basis), a nonionic surfactant in an amount from about 0.27 to about 0.4 weight percent (total weight basis), and an amphoteric surfactant in an amount of from about 0.4 to about 0.54 weight percent (total weight basis).

10. The chemical wash of claim 1 wherein said amphoteric surfactant is present in an amount from about 3 to about 80 weight percent (based on the total weight of anionic, nonionic and amphoteric surfactant).

11. The chemical wash of claim 10 wherein said amphoteric surfactant is present in an amount from about 3 to about 50 weight percent (based on the total weight of anionic, nonionic and amphoteric surfactant).

12. The chemical wash of claim 11 wherein said amphoteric surfactant is present in an amount from about 3 to about 20 weight percent (based on the total weight of anionic, nonionic and amphoteric surfactant).

13. In a method of cementing a conduit in a borehole wherein a zone in said borehole to be contacted with a cement slurry is flushed with an aqueous, substantially unfoamed chemical wash composition and the cement slurry is thereafter injected into said zone and wherein the aqueous chemical wash is of the type containing water, a water soluble amphoteric surfactant and a mixture of dispersed friable oil-soluble resin particles and oil-soluble pliable resin particles, the improvement comprising the use of an aqueous chemical wash composition in which at least a portion but not all of the amphoteric surfactant has been replaced by a combination of a water soluble anionic surfactant and a nonionic surfactant, said combination being present in an amount of from about 20 weight percent to about 97 weight percent based on the total surfactant content of said composition.

14. The method of claim 13 wherein the amphoteric surfactant is a water soluble reaction product of at least one di-or trialkanol amine, or a mixture thereof, with at least one fatty acid.

15. In a method for removing drilling mud from a borehole by contacting the mud with an effective quantity of a chemical wash composition of a type containing water, a water soluble amphoteric surfactant and a mixture of dispersed oil-soluble friable and oil-soluble pliable resin particles, and displacing said mud from said borehole, the improvement comprising the use of an aqueous, substantially unfoamed chemical wash composition in which at least a portion but not all of the amphoteric surfactant is replaced by a combination of a water soluble anionic surfactant and a nonionic surfactant, said combination being present in an amount of from about 20 weight percent to about 97 weight percent based on the total surfactant content of said composition.

16. The method of claim 15 wherein the amphoteric surfactant is a water soluble reaction product of at least one di- or trialkanol amine, or a mixture thereof, with at least one fatty acid.

* * * * *